(12) United States Patent
Kaku (10) Patent No.: US 11,491,555 B2
(45) Date of Patent: Nov. 8, 2022

(54) LATHE

(71) Applicant: STAR MICRONICS CO., LTD., Shizuoka (JP)

(72) Inventor: Norio Kaku, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 245 days.

(21) Appl. No.: 16/887,322

(22) Filed: May 29, 2020

(65) Prior Publication Data
US 2020/0290128 A1 Sep. 17, 2020

Related U.S. Application Data

(63) Continuation of application No. PCT/JP2018/047191, filed on Dec. 21, 2018.

(30) Foreign Application Priority Data

Jan. 16, 2018 (JP) .............................. JP2018-004801

(51) Int. Cl.
*B23B 31/26* (2006.01)
*B23B 31/20* (2006.01)

(52) U.S. Cl.
CPC ........ *B23B 31/265* (2013.01); *B23B 31/2072* (2021.01); *Y10T 409/309464* (2015.01)

(58) Field of Classification Search
CPC . B23B 31/207; B23B 31/2072; B23B 31/265; Y10T 409/309464
See application file for complete search history.

(56) References Cited

U.S. PATENT DOCUMENTS

| 1,881,658 A | * 10/1932 | Kelleher | ............... B23B 31/207 |
| | | | 279/46.2 |
| 3,097,856 A | 7/1963 | Brown | |
| 4,379,562 A | 4/1983 | Corbacho | |

(Continued)

FOREIGN PATENT DOCUMENTS

| CH | 275512 A | * 5/1951 |
| CN | 1810444 | 8/2006 |
| CN | 105142859 | 12/2015 |

(Continued)

OTHER PUBLICATIONS

Translation of KR-2016090499-A, provided by Espacenet website, Mar. 31, 2022.*

(Continued)

*Primary Examiner* — Eric A. Gates
(74) *Attorney, Agent, or Firm* — Lex IP Meister, PLLC (57) ABSTRACT

Provided is a lathe capable of elongating the life of a shifter mechanism. A lathe comprises a spindle, a chucking unit, a power transmitting unit, a shifter, a claw, and a driving unit. The shape of an outer circumference of the shifter in a contact range and a first end of the claw in longitudinal section along the spindle axis is such shape as the acceleration "a" of the first end in the diameter direction with respect to the moving distance of the shifter moving in the direction of the spindle axis (Z-axis direction) at a constant speed is continuous both in a positive range and in a negative range where the contact range is a range of the outer circumference of the shifter in contact with the first end of the claw.

5 Claims, 9 Drawing Sheets

(56) References Cited

U.S. PATENT DOCUMENTS

| | | | |
|---|---|---|---|
| 10,226,845 B2 * | 3/2019 | Ogasawara | ........ B23Q 11/1015 |
| 2013/0249174 A1 | 9/2013 | Kishi et al. | |

FOREIGN PATENT DOCUMENTS

| | | | |
|---|---|---|---|
| EP | 3375565 | | 9/2018 |
| FR | 508962 A | * | 10/1920 |
| FR | 511941 A | * | 1/1921 |
| JP | H06246516 | | 9/1994 |
| JP | H10-0315020 | | 12/1998 |
| JP | 2002-0066815 | | 3/2002 |
| JP | 2002-0337082 | | 11/2002 |
| JP | 2017-0177317 | | 10/2017 |
| KR | 10-2011-0072415 | | 6/2011 |
| KR | 2016090499 A | * | 8/2016 |
| TW | 201240753 | | 10/2012 |

OTHER PUBLICATIONS

JPO, Office Action of JP 2018-004801 dated Dec. 7, 2021.
EPO, Search Report of EP 18901633.0 dated Jul. 26, 2021.
TIPO, Office Action of TW application No. 107136728, dated Nov. 16, 2021.
SIPO, Office Action of CN 201880078755.X dated Jul. 29, 2022.

* cited by examiner

Comparative example

FIG. 11

LATHE

CROSS-REFERENCE TO RELATED APPLICATION

The present application is a continuation of PCT Application No. PCT/JP2018/047191 filed on Dec. 21, 2018, which claims priority of Japanese Patent Application No. 2018-004801 filed on Jan. 16, 2018. The contents of this application are incorporated herein by reference in their entirety.

BACKGROUND

(a) Field

The present invention relates to a lathe having a shifter mechanism which opens and closes a chucking unit for a workpiece.

(b) Description of the Related Art

A lathe provided with a shifter mechanism which opens and closes a chucking unit for a workpiece is well known. A workpiece chucking apparatus disclosed in Japanese Unexamined Patent Application Publication No. 2002-337082 (especially, paragraph 0031) comprises an operation unit movable in an axial direction of a cylindrical body to open and close a chucking part of a chuck, a linear motor which moves the operation unit in the axial direction by thrust, and a thrust transmitting unit which increases the thrust and transmits the increased thrust to the linear motor. The thrust transmitting unit comprises a linear motion unit movable in the axial direction by actuation of the linear motor and a lever pivotable by the axial movement of the linear motion unit to transmit the thrust to the operation unit under the principle of lever. The lever has a first end engageable with the linear motion unit and a second end engageable with the operation unit. The engaging surface of the linear motion unit comprises four areas in such direction as the first end of the lever is gradually separated from the axis of the cylindrical body: a forth area having an angle of approximately 25 degrees with respect to the inner circumference of the linear motion unit, a third area having an angle of approximately 10 degrees, a second area having an angle of approximately 5 degrees, and finally a first area almost parallel to the inner circumference of the linear motion unit.

SUMMARY

The angled engaging surface of the linear motion unit causes a rapid change in acceleration of the lever in every point of change in angle. Particularly, there occurs a rapid change in acceleration of the first end of the lever in every point of change in angle in a diameter direction perpendicular to the axis of the cylindrical body. When the linear motion unit is moved in the axial direction to bring the first end of the lever away from the axis, the first end of the lever first comes to the fourth area of approximately 25 degrees. The acceleration of the first end of the lever becomes suddenly high in the diameter direction, causing an occurance of a larger impact in chucking the workpiece and a higher surface pressure between the linear motion unit and the lever. The higher surface pressure causes abrasion or wear of the lever and the linear motion unit (the shifter mechanism) and shortens the life thereof. The problem resides in a variety of lathes.

The purpose of the invention is to provide a lathe capable of elongating the life of the shifter mechanism.

A lathe of the invention comprises a spindle rotatable on a spindle axis; a chucking unit mounted on the spindle to hold a workpiece in a closed state and release the workpiece in an open state; a power transmitting unit having a first contact part in contact with the chucking unit and a second contact part opposite the first contact part with respect to a direction of the spindle axis, the power transmitting unit being movable in the direction of the spindle axis to open and close the chucking unit; a shifter arranged outside the spindle to be movable in the direction of the spindle axis; a claw having a first end in contact with an outer circumference of the shifter and a second end in contact with the second contact part of the power transmitting unit, the claw being caused to tilt in such direction as a distance from the spindle axis to the first end is changed; a driving unit which moves the shifter in the direction of the spindle axis to tilt the claw and thereby move the power transmitting unit in the direction of the spindle axis; wherein a shape of the outer circumference of the shifter in a contact range and the first end of the claw in longitudinal section along the spindle axis is such shape as an acceleration of the contact end in a diameter direction with respect to a moving distance of the shifter moving in the direction of the spindle axis at a constant speed is continuous both in a positive range and in a negative range where the diameter direction is a direction perpendicular to the spindle axis and the contact range is a range of the outer circumference of the shifter in contact with the first end of the claw.

A lathe of the invention comprises a spindle rotatable on a spindle axis; a chucking unit mounted on the spindle to hold a workpiece in a closed state and release the workpiece in an open state; a power transmitting unit having a first contact part in contact with the chucking unit and a second contact part opposite the first contact part with respect to a direction of the spindle axis, the power transmitting unit being movable in the direction of the spindle axis to open and close the chucking unit; a shifter arranged outside the spindle to be movable in the direction of the spindle axis; a claw having a first end in contact with an outer circumference of the shifter and a second end in contact with the second contact part of the power transmitting unit, the claw being caused to tilt in such direction as a distance from the spindle axis to the first end is changed; a driving unit which moves the shifter in the direction of the spindle axis to tilt the claw and thereby move the power transmitting unit in the direction of the spindle axis; wherein the shape of the outer circumference of the shifter in longitudinal section along the spindle axis is first extended along the direction of the spindle axis and then curved in a first half of a contact range when the shifter is moved in such direction of the spindle axis as to bring the first end away from the spindle axis where the contact range is a range of the outer circumference of the shifter in contact with the first end of the claw.

The invention improves the life of the shifter mechanism.

DETAILED DESCRIPTION

Hereinafter, an embodiment of the present invention will be described. The invention is not limited to the exemplary embodiment and the features disclosed herein are not necessarily essential to the invention.

(1) Summary of inventive technology: Technology of the invention will be described with reference to FIG. 1 to FIG. 11. The drawings only schematically show an example of the invention. They may have a mismatch to each other due to different maginification in each direction. Each element denoted by a symbol is only an example. The value range (Min-Max) means the minimum or more and the maximum or less.

(Embodiment 1) A lathe 1 of an embodiment of the invention may comprise a spindle 32, a chucking unit 60, a power transmitting unit TR1, a shifter 10, a claw 20, and a driving unit DR1. The spindle 32 may be rotatable on a spindle axis AX0. The chucking unit 60 may be mounted on the spindle 32 to hold a workpiece W0 in a closed state and release the workpiece W0 in an open state. The power transmitting unit TR1 may have a first contact part (for example, an inverted tapered part 63a) in contact with the chucking unit 60 and a second contact part (for example, a rear end face 65b) opposite the first contact part in a direction of the spindle axis (for example, a Z-axis direction). The power transmitting unit TR1 may be movable in the direction of the spindle axis (the Z-axis direction) to open and close the chucking unit 60. The shifter 10 may be arranged outside the spindle 32 to be movable in the direction of the spindle axis (the Z-axis direction). The claw 20 may have a first end (for example, a contact end 21) in contact with an outer circumference 11 of the shifter 10 and a second end (for example, a root 22) in contact with the second contact part (the rear end face 65b). The claw 20 may be caused to tilt in such direction as a distance from the spindle axis AX0 to the first end 21 is changed (for example, such direction as a diameter-direction position D is changed). The driving unit DR1 may move the shifter 10 in the direction of the spindle AX0 to tilt the claw 20 and thereby move the power transmitting unit TR1 in the direction of the spindle axis (the Z-axis direction). A direction perpendicular to the spindle axis AX0 may be referred to as a diameter direction D4. A range of the outer circumference 11 of the shifter 10 in contact with the first end of the claw 20 may be referred to as a contact range R. The shape of the outer circumference 11 of the shifter 10 in the contact range R1 and the first end (21) of the claw 20 in longitudinal section along the spindle axis AX0 (for example, in vertical section as shown in FIG. 2) may be such shape as the acceleration "a" of the first end (21) in the diameter direction D4 with respect to the moving distance (L) of the shifter 10 moving in the direction of the spindle axis (the Z-axis direction) at a constant speed is continuous both in a positive range and in a negative range.

Since the acceleration "a" of the first end (21) with respect to the moving distance L is made continuous both in the positive range and in the negative range as described above, the claw 20 can be caused to tilt in continuous and smooth acceleration and deceleration as the shifter 10 is moved in the direction of the spindle axis (the Z-axis direction). A rapid change in acceleration of the first end (21) of the claw 20 is thereby prevented, which lessens an impact in chucking the workpiece W0 and lowers a surface pressure between the outer circumference 11 and the first end (21), and thereby suppresses abrasion or wear of the shifter 10 and the claw 20 (the shifter mechanism). The embodiment provides a lathe capable of elongating the life of the shifter mechanism.

The spindle may not be limited to the back spindle. The invention may be applied to the front spindle. The chucking unit may comprise a variety of chucking units including a claw and a collet. The conceptional workpiece may comprise a product. The acceleration "a" with respect to the moving distance L may be calculated from a shape data in longitudinal section representing the shape of the outer circumference of the shifter in the contact range and the first end of the claw. The diameter-direction position D of the first end with respect to the moving distance L of the shifter may be calculated from those shape data. The position D, which is represented by a function of the moving distance L, may be differentiated twice into the acceleration "a". The continuous acceleration in the positive range means that the acceleration may continue with a continuous curve between a first point where the acceleration becomes from zero or less to a positive value and a last point where the acceleration becomes from a positive value to zero or less when the moving distance L increases in the L-a plane. The continuous acceleration in the negative range means that the acceleration may continue with a continuous curve between a first point where the acceleration becomes from zero or more to a negative value and a last point where the acceleration becomes from a negative value to zero or more when the moving distance L increases in the L-a plane.

Figure 2:
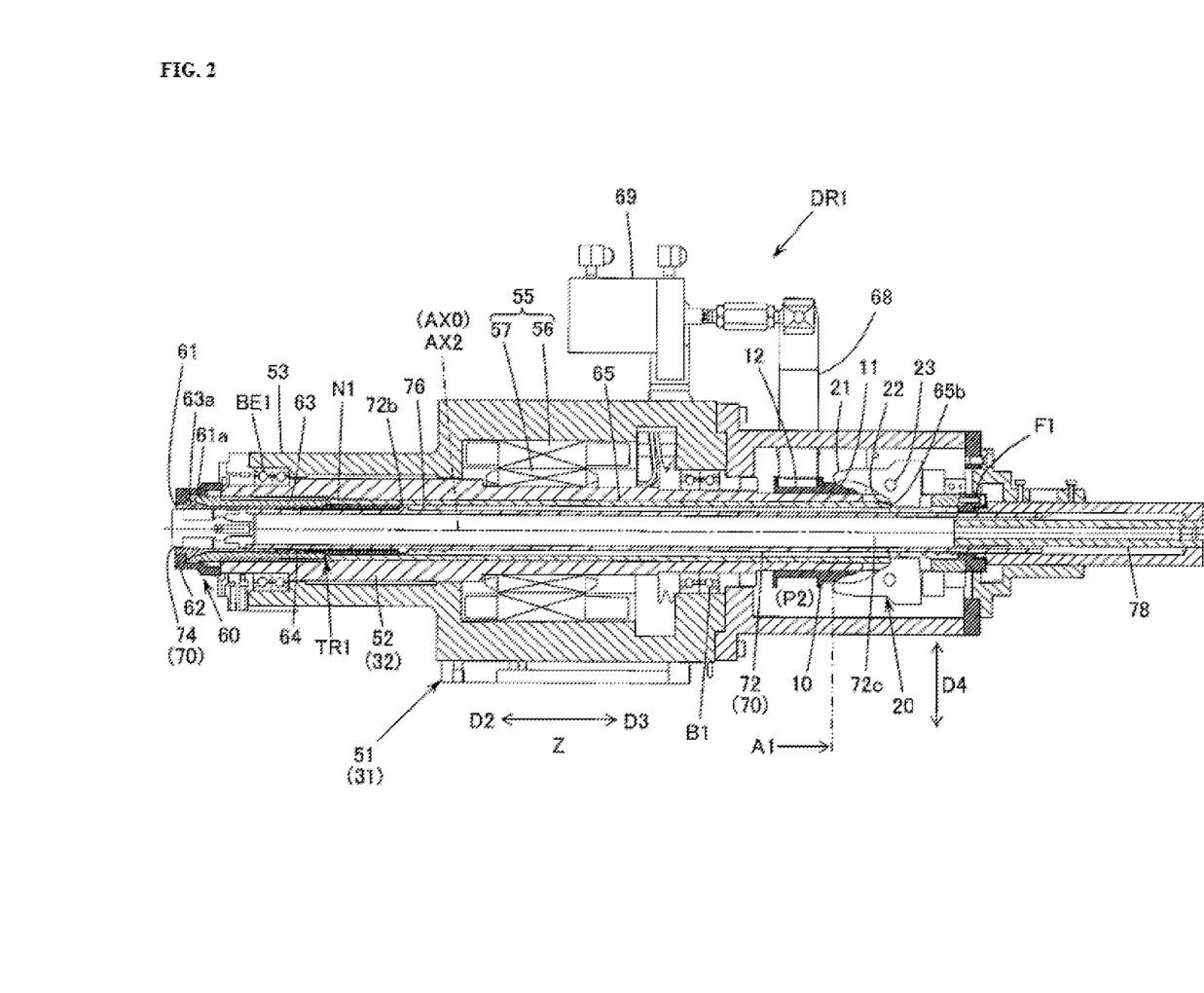
FIG. 2 is a longitudinal section view of a headstock.

The shape of the outer circumference 11 of the shifter 10 in the contact range R1 and the first end (21) of the claw 20 in longitudinal section along the spindle axis AX0 (for example, in vertical section as shown in FIG. 2) may be such shape as the acceleration "a" of the first end (21) in the diameter direction D4 with respect to the moving distance L of the shifter 10 moving in the direction of the spindle axis (the Z-axis direction) at a constant speed is continuous in the whole of the range. The claw 20 can caused to tilt in continuous and smooth acceleration and deceleration in the whole of the range as the shifter10 is moved in the direction of the spindle axis (the Z-axis direction). The embodiment provides a lathe capable of elongating the life of the shifter mechanism. A preferred shape of the outer circumference 11 and the first end (21) may be a cam curve capable of providing continuous velocity change and continuous acceleration change. Such cam curve includes a modified sine, a modified trapezoid, and a modified constant velocity. A more preferred shape may be a modified sine or a cam curve capable of further reducing the maximum velocity and the maximum acceleration during movement.

Figure 6A:
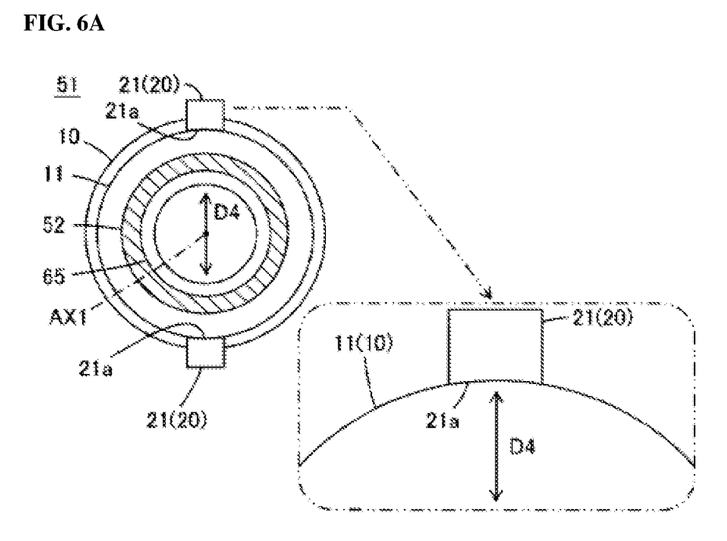
FIG. 6A schematically shows a cross section of the headstock taken along line A1 of FIG. 2.
Figure 6B:
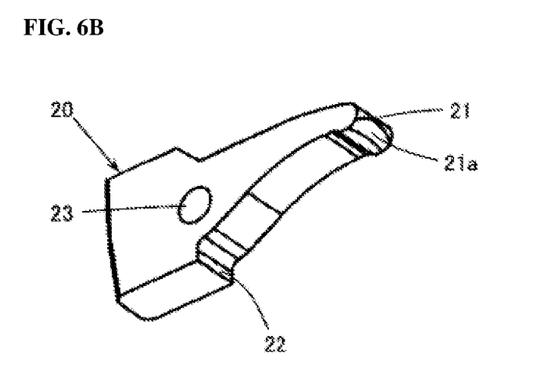
FIG. 6B is a perspective view schematically showing an appearance of the claw.
Figure 7:
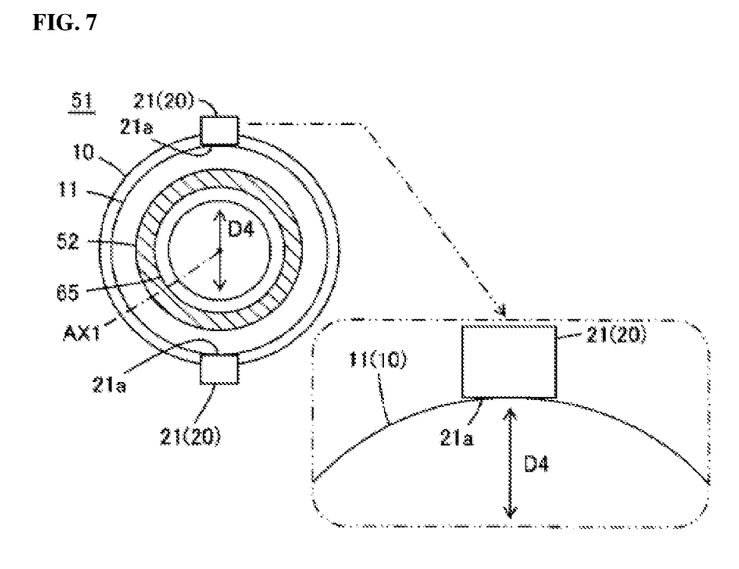
FIG. 7 is another example of a cross section of the headstock taken along line A1 of FIG. 2.

(Embodiment 2) As shown in FIG. 6A and FIG. 6B, a contact surface 21a of the first end (21) in contact with the outer circumference 11 of the shifter 10 may be concaved in cross section perpendicular to the spindle axis AX0 (for example, a cross section shown in FIG. 6A) in a radius of curvature on the spindle axis AX0 equal to the radius of curvature of the outer circumference 11 or greater. Such embodiment may reduce the surface pressure (so-called Hertzian contact stress) of the contact surface 21a with the outer circumference 11. Reduced pressure lessens abrasive wear of the shifter mechanism, which likely occurs during initial use, resulting in survival of a hardened part of the shifter mechanism. The clamping force of the chucking unit 60 is kept stable and the life of the shifter mechanism is thereby further elongated. Such effect is still expected even when the radius of curvature of the contact surface 21a is equal to the radius of curvature of the outer circumference 11. Such effect is still expected even when the radius of curvature of the contact surface 21a is greater than the radius of curvature of the outer circumference 11. Such effect is still expected in the flat contact surface as shown in FIG. 7.

Figure 8:
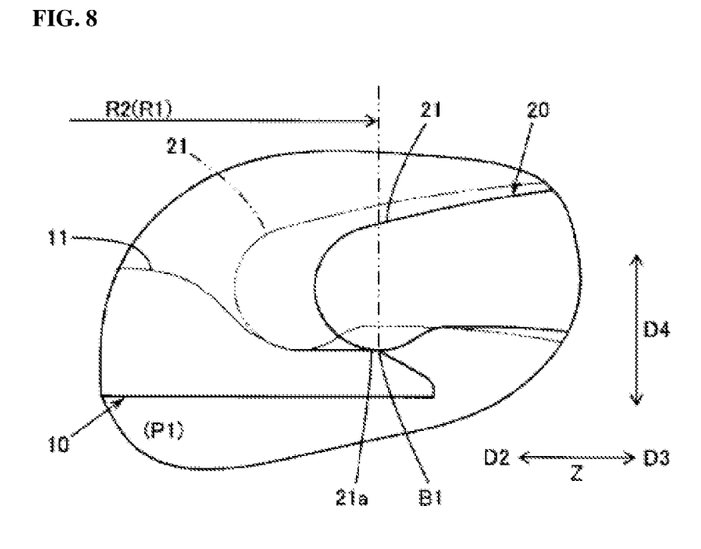
FIG. 8 schematically shows a part of an outer circumference of the shifter and the first end of the claw.

(Embodiment 3) As shown in FIG. 8, the shape of the outer circumference 11 of the shifter 10 in longitudinal section along the spindle axis AX0 may be first extended along the direction of the spindle axis AX0 and then curved in a first half R2 of the contact range R1 when the shifter 10 is moved in such direction of the spindle axis AX0 as to bring the first end (21) away from the spindle axis AX0. Such shape prevents a rapid change in acceleration of the claw 20 at the beginning of the movement in that direction. The claw 20 is caused to tilt in continuous and smooth acceleration and deceleration, which suppresses the shock in chucking the workpiece W0 and reduces the surface pressure between the outer circumference 11 and the first end (21). Reduced pressure prevents abrasion or wear of the shifter mechanism, thereby improving the life thereof.

(Embodiment 4) The lathe 1 of the embodiment may comprise the spindle 32, the chucking unit 60, the power transmitting unit TR1, the shifter 10, the claw 20, and the driving unit DR1. The shape of the outer circumference 11 of the shifter 10 in longitudinal section along the spindle axis AX0 may be first extended along the direction of the spindle axis AX0 and then curved in the first half R2 of the contact range R1 when the shifter 10 is moved in such direction of the spindle axis AX0 as to bring the first end (21) away from the spindle axis AX0.

Such shape prevents a rapid change in acceleration of the claw 20 at the beginning of the movement in that direction. The claw 20 is caused to tilt in continuous and smooth acceleration and deceleration. Since a rapid change in acceleration of the claw 20 during a first half of the movement is prevented, the chucking shock is suppressed and the surface pressure is reduced. Reduced pressure prevents abrasion or wear of the shifter mechanism, thereby improving the life thereof.

Figure 1:
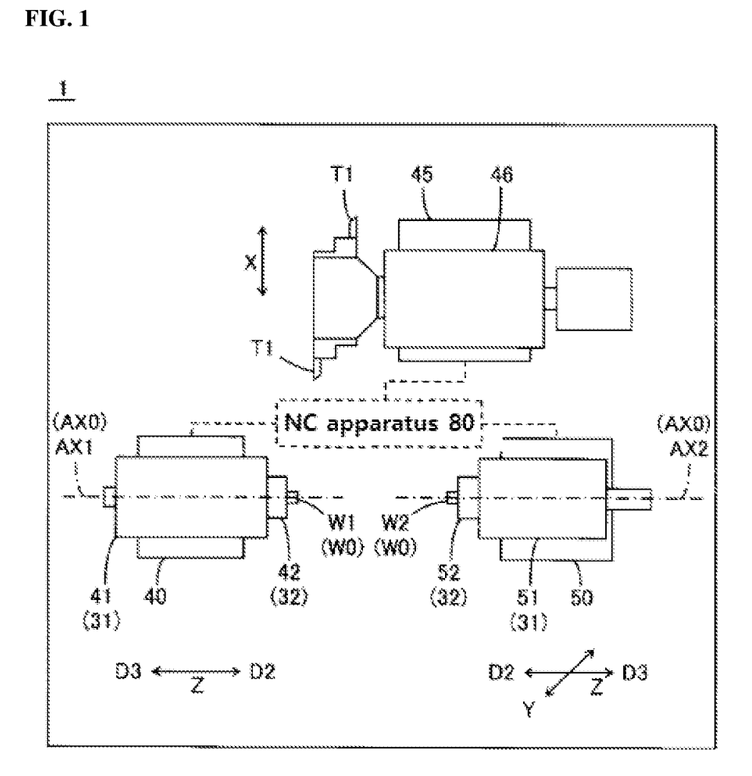
FIG. 1 is a diagram schematically showing a configuration of a lathe.

(2) Configuration of the lathe: FIG. 1 schematically shows a configuration of an NC lathe 1 of slidable headstock type as an example of the lathe. The lathe 1 may comprise an NC apparatus 80, a front headstock 41 mounted on a fixed base 40, a back headstock 51 mounted on a fixed base 50, and a tool post 46 mounted on a fixed base 45. The front headstock 41 and the back headstock 51 are collectively referred to as a headstock 31. The NC apparatus 80 numerically controls the front headstock 41, the back headstock 51, and the tool post 46.

The front headstock 41 may be movable in the Z-axis direction along the spindle axis AX1. The NC apparatus 80 may control the Z-axis direction position of the front headstock 41 by a driving unit (not shown) of the front headstock 41. A front spindle 42 mounted on the front headstock 41 may releasably chuck a columnar bar workpiece W1 inserted in the Z-axis direction with a collet (not shown) to rotate it around the spindle axis AX1 extended in the longitudinal direction of the workpiece W1. The Z-axis direction may be a horizontal direction in this embodiment but not limited thereto.

The back headstock 51 may be movable in the Z-axis direction along the spindle axis AX2 and in the Y-axis direction perpendicular to the Z-axis direction. The NC apparatus 80 may control the Z-axis direction position and the Y-axis direction position of the back headstock 51 by a driving unit (not shown) of the back headstock 51. A back spindle 52 mounted on the back headstock 51 may releasably chuck a workpiece W2 with a collet (not shown) to rotate it around the spindle axis AX2 where the workpiece W2 is inserted in the Z-axis direction and whose front side has been machined. The back spindle 52 may be referred to as an opposite spindle since it is opposite the front spindle. The Y-axis direction may be a vertical direction in this embodiment but not limited thereto. The front spindle 42 and the back spindle 52 may be collectively referred to as a spindle 32. The spindle axis AX1 of the front spindle 42 and the spindle axis AX2 of the back spindle 52 may be collectively referred to as a spindle axis AX0. The workpiece W1 and the workpiece W2 may be collectively referred to as a workpiece W0.

The tool post 46 may be movable in the X-axis direction perpendicular to the Z-axis and the Y-axis directions. A plurality of tools T1 may be attached to the tool post 46. The NC apparatus 80 may control the X-axis direction position of the tool post 46 by a driving unit (not shown) of the tool post 46. The X-axis direction may be a perpendicular direction in this embodiment but not limited thereto. The tool post 46 may comprise a turret tool post and a gang tool post. A plurality types of tool posts may be provided in the lathe. The moving direction of the front headstock 41, the back headstock 51, and the tool post 46 is not limited to the directions in FIG. 1. The configuration of the back headstock 51 is being fully described as an example of the headstock 31.

FIG. 2 shows a longitudinal section view of the back headstock 51 along the spindle axis AX2. A product ejector 70 may be arranged at a through-hole extended along the spindle axis AX2 of the back spindle 52. The product ejector 70 may be replaced by a pipe or something allowing a product to be ejected.

The back spindle 52 may be rotatably mounted on a stationary supporting unit 53 with a bearing BE1. The supporting unit 53 is mounted on the back headstock 51. A chuck sleeve 63 and a push sleeve 65 may be inserted in the back spindle 52 in the Z-axis direction. A sleeve nut N1 may be removably attached to the chuck sleeve 63. A through-hole extended along the spindle axis AX2 may be formed in the sleeve nut N1, the chuck sleeve 63, and the push sleeve 65. The product ejector 70 may be inserted in the through-hole in the Z-axis direction. The back spindle 52 along with the chuck sleeve 63 and the push sleeve 65 may be rotated on the spindle axis AX2 around the product ejector 70. A built-in motor 55 may be mounted on the outer circumference of the back spindle 52. The built-in motor 55 may comprise a stator 56 on the side of the supporting unit 53 and a rotor 57 on the side of the back spindle 52. The back spindle 52 may be driven by a timing motor 55 under control of the NC apparatus 80.

A chucking unit 60 may have a collet 61 and a cap 62. The chucking unit 60 may hold the workpiece W2 inserted in the back spindle 52 in a closed state and release the chucked product (the workpiece W2 whose back side has been machined) in an open state. In FIG. 2, the chucking unit 60 is in the closed state without chucking the workpiece W2. The collet 61 may be mounted at the front end of the back spindle 52 to releasably chuck the workpiece W2 supplied from the front headstock 41. The collet 61 may be rotated as the back spindle 52 is rotated. The collet 61 may have a tapered part 61a on the outer circumference thereof. The tapered part 61a becomes gradually thinner toward the rear. The tapered part 61a may have a slit formed in a plurality of positions (three positions, for example). When the tapered part 61a is tightened by the chuck sleeve 63, the workpiece W2 is chucked (in the closed state). When the tapered part 61a is loosened, the workpiece W2 is released (in the open state) since the tapered part 61a is expanded by its own resilient force. The cap 62 may be attached at the front end of the back spindle 52 to hold the collet 61. The cap 62 may be rotated as the back spindle 52 is rotated.

The back headstock 51 may be provided with a power transmitting unit TR1 movable in the Z-axis direction to open and close the chucking unit 60. The power transmitting unit TR1 may comprise the chuck sleeve 63 having the sleeve nut N1, a coil spring 64 for opening the collet, and the push sleeve 65. The sleeves (N1, 63, 65) and the spring 64 may be arranged inside the back spindle 52 with respect to the diameter direction D4 perpendicular to the spindle axis AX2. The sleeves (N1, 63, 65) and the spring 64 may be concentric to the back spindle 52. The chuck sleeve 63 may have an inverted tapered part 63a on the inner circumference of the front end thereof. The inverted tapered part 63a becomes gradually separated from the spindle axis AX2 toward the front in such manner as to match the tapered part 61a of the collet 61. The inverted tapered part 63a is an example of a first contact part in contact with the chucking unit 60. The chuck sleeve 63 may be slidable in the Z-axis direction. When the chuck sleeve 63 slides in the advancing direction D2, the tapered part 61a of the collet 61 is tightened toward the spindle axis AX2 (the closed state) by the inverted tapered part 63a. When the chuck sleeve 63 slides in the retracting direction D3, the tapered part 61a of the collet 61 is loosened (the open state). The advancing direction D2 may be a direction in which the workpiece W2 is pushed forward out of the back spindle 52 in the Z-axis direction. The retracting direction D3 may be the opposite direction. The spring 64 may be hooked to the collet 61 at a forward end on the advancing direction D2 side and to the inner circumference of the chuck sleeve 63 at a rearward end on the retracting direction D3 side to apply rearward force to the chuck sleeve 63. The front end face of the push sleeve 65 may be in contact with the rear end face of the chuck sleeve 63. The rear end face 65b of the push sleeve 65 may be in contact with a root 22 of the claw 20 (an example of the second end) as described later. The rear end face 65b is an example of the second contact part opposite the first contact part in the Z-axis direction. The push sleeve 65 may be slidable in the Z-axis direction. The push sleeve 65 may be pushed by the root 22 of the claw 20 to slide in the advancing direction D2 while pushed by the rear end face of the chuck sleeve 63 to slide in the retracting direction D3 by urging force of the spring 64.

A shifter 10 may be arranged outside the rear end of the back spindle 52 with respect to the diameter direction D4. The shifter 10 may be movable in the Z-axis direction along with a shifter lever 68 of a driving unit DR1 whose feature is described later. The shifter 10 may have a through-hole extended along the spindle axis AX2 into which the back spindle 52 is inserted in the Z-axis direction. The inner circumference of the shifter 10 may be in contact with the outer circumference of the back spindle 52 in a slidable manner. The shifter 10 may be a cylindrical member concentric to the back spindle 52. On the outer periphery of the shifter 10, a groove 12 may be formed on the front portion out of contact with the flaw 20. The shifter lever 68 may be inserted inside the groove 12 with respect to the diameter direction. The shifter 10 may have an outer circumference 11 whose feature is described later. The shifter 10 may be slidable in the Z-axis direction within a predetermined moving range, for example, a range between an advanced position P1 shown in FIG. 4A and a retracted position P2 shown in FIG. 4B.

A plurality of claws 20 may be arranged in contact with the outer circumference 11 on the retracting direction D3 side of the shifter 10. FIG. 2 shows opposite claws 20 across the spindle axis AX2. The number of claws 20 may be two, three or four or more. The claws 20 may be arranged at regular intervals along the outer circumference 11 of the shifter 10 around the spindle axis AX2. As shown in FIG. 6B, the claw 20 may have a contact end 21 (an example of the first end) in contact with the outer circumference 11 of the shifter 10 and the root 22 (an example of the second end) in contact with the rear end face 65b of the push sleeve 65. The claw 20 may be rotated around a pivot 23 to tilt the contact end 21 in such direction as the distance from the spindle axis AX2 to the contact end 21 is changed. The central axis of the pivot 23 may be distant from the spindle axis AX2. The direction of the central axis of the pivot 23 may be different from the Z-axis direction by 90 degrees. The claw 20 may be rotated as the back spindle 52 rotates. The distance from the pivot 23 to the contact end 21 may be longer than the distance from the pivot 23 to the root 22. Therefore, the force applied to the power transmitting unit TR1 from the claw 20 may be greater than the force applied to the claw 20 from the shifter 10 by using the pivot 23 as a fulcrum point under the principle of lever. The contact end 21 may have a unique shape as described later.

The driving unit DR1 may comprise the shifter lever 68 and a collet actuator 69 to move the shifter 10 in the Z-axis direction. The shifter lever 68 inserted in the groove 12 of the shifter 10 may slidably move the shifter 10 in the Z-axis direction within the predetermined moving range by the operation of the actuator 69. The actuator 69 may move the shifter lever 68 in the Z-axis direction within the predetermined moving range under control of the NC apparatus 80. The actuator 69 may comprise a linear servo motor, an air cylinder, and a hydraulic cylinder. The actuator 69 may comprise a speed reducer such as a ball screw mechanism. The driving unit DR1 may move the shifter 10 in the Z-axis direction within the predetermined moving range to rotate the claw 20 on the pivot 23 to thereby move the power transmitting unit TR1 in the Z-axis direction.

When the shifter 10 is slidably moved in the retracting direction D3 from the advanced position P1 to the retracted position P2 by the actuator 69 via the shifter lever 68, the claw 20 may be rotated by the shifter 10 to tilt the contact end 21 away from the spindle axis AX2. Then, the root 22 of the claw 20 may slidably move the chuck sleeve 63 via the push sleeve 65 in the advancing direction D2 to tighten the collet 61 to thereby chuck the workpiece W2. The contact end 21 may be kept in contact with the outer circumference 11 during the movement of the shifter 10. When the shifter 10 is slidably moved in the advancing direction D2 from the retracted position P2 to the advanced position P1 by the actuator 69 via the shifter lever 68, the chuck sleeve 63 and the push sleeve 65 are retracted by the press force of the spring 64 to rotate the claw 20 to tilt the contact end 21 toward the spindle axis AX2. The collet 61 may thereby be loosened to release a product whose back side has been machined (the workpiece W2) out of the collet 61. The contact end 21 may be kept in contact with the outer circumference 11 during the movement of the shifter 10.

The product ejector 70 may be inserted inside the chuck sleeve 63 and the push sleeve 65 in a movable manner in the Z-axis direction. The product ejector 70 may comprise a cylindrical product eject shaft 72 and an eject pin 74. The eject shaft 72 may have a through-hole 72c extended in the Z-axis direction. The eject pin 74 may be removably attached at the front end of the eject shaft 72. A coil spring 76 for ejecting a product may be attached outside the eject shaft 72. A front end of the coil spring 76 in a compressed state in the Z-axis direction may be hooked to an expanded diameter portion 72b of the eject shaft 72. A rear end of the coil spring 76 may be hooked to a flange F1. The workpiece W2 whose front side has been machined may be inserted to the collet 61 in the open state and then chucked by the collet 61 in the closed state. The collet 61 is then opened and a product (the workpiece W2 whose back side has been machined) is ejected to the advancing direction D2 by the resilient force of the spring 76. A pipe 78 for blow oil and air may be inserted at the rear end of the eject shaft 72.

Figure 3A:
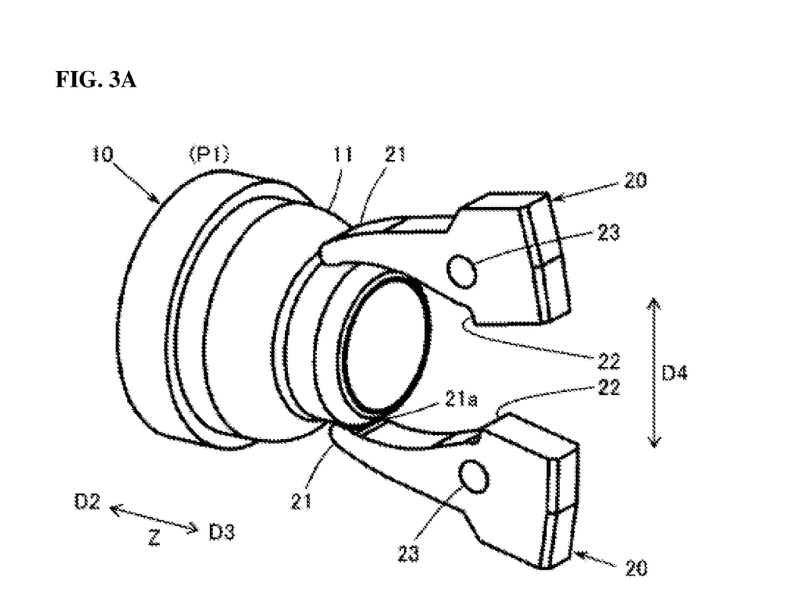
FIG. 3A is a perspective view of a schematically illustrated shifter in the advanced position and a claw.
Figure 3B:
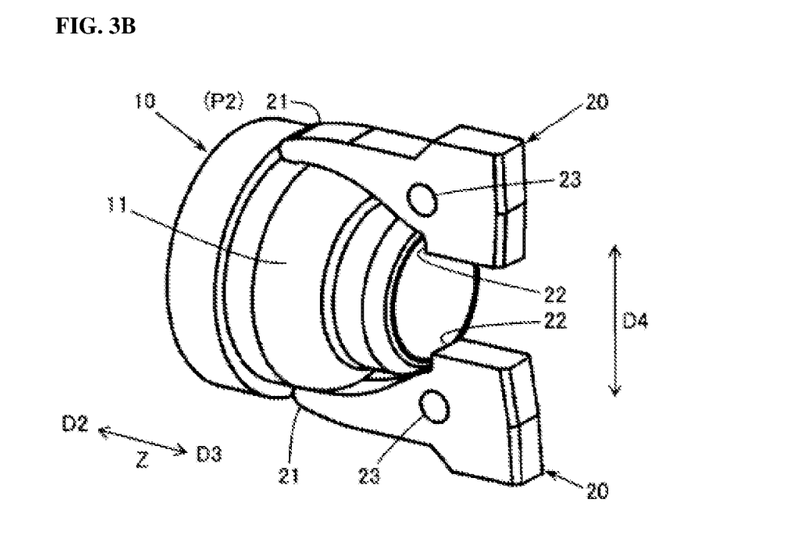
FIG. 3B is a perspective view of the schematically illustrated shifter in the retracted position and a claw.
Figure 4A:
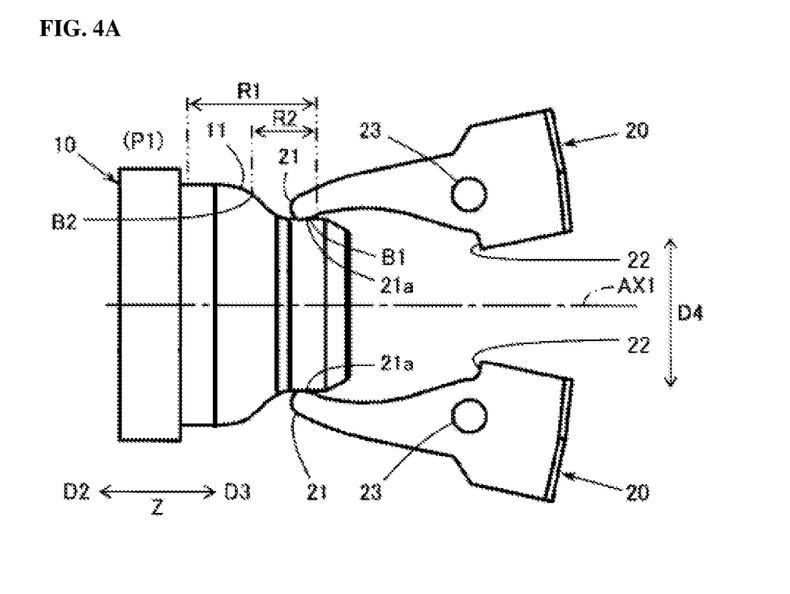
FIG. 4A is a front view of the schematically illustrated shifter in the advanced position and a claw.
Figure 4B:
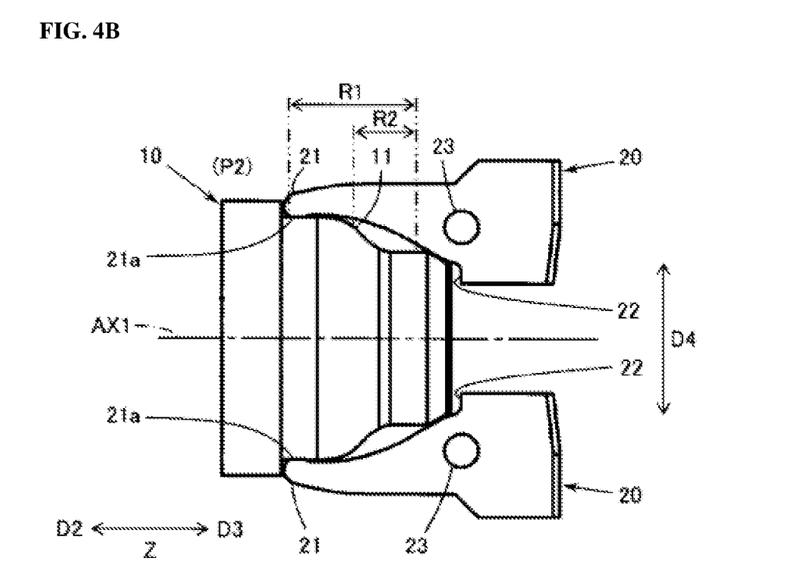
FIG. 4B is a front view of the schematically illustrated shifter in the retracted position and a claw.

FIG. 3A is a perspective view of a schematically illustrated shifter mechanism (the shifter 10 and the claw 20) in the advanced position P1. FIG. 3B is a perspective view of a schematically illustrated shifter mechanism in the retracted position P2. FIG. 4A is a front view of a schematically illustrated shifter mechanism in the advanced position P1. FIG. 4B is a front view of a schematically illustrated shifter mechanism in the retracted position P2. The drawings also show lines representing a carved shape of the shifter 10 and the claw 20.

When the shifter 10 is in the moving range (between the advanced position P1 and the retracted position P2), the contact end 21 of the claw 20 may be kept in contact with the outer circumference 11 of the shifter 10 in a contact range R1 as shown in FIG. 4A and FIG. 4B. The contact range R may be a range between a furthest contact point of the contact end 21 with the outer circumference 11 on the retracting direction D3 side when the shifter 10 is in the advanced position P1 and a furthest contact point of the contact end 21 with the outer circumference 11 on the advancing direction D2 side when the shifter 10 is in the retracted position P2. The contact point of the contact end 21 with the outer circumference 11 varies according to the position of the shifter 10 in the Z-axis direction. The contact range R1 may be a range that the contact end 21 is kept in contact with the outer circumference 11 while the shifter 10 in the advanced position P1 is moved to the retracted position P2.

Figure 5A:
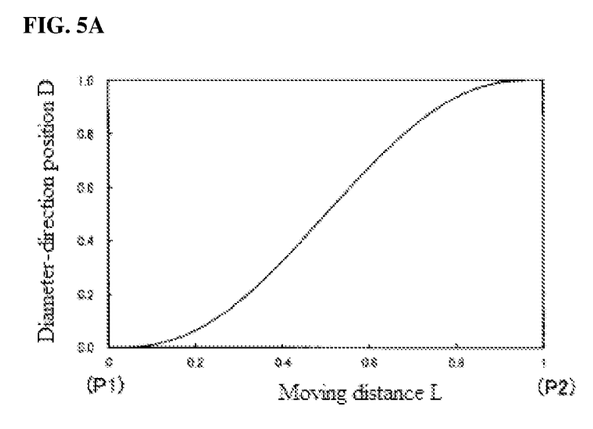
FIG. 5A schematically shows a diameter-direction position of a first end of the claw with respect to a moving distance of the shifter.
Figure 5B:
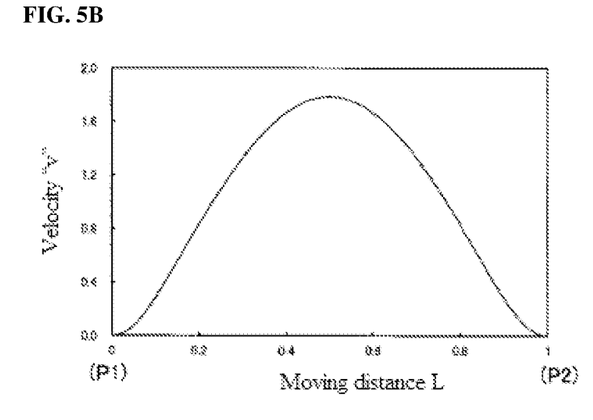
FIG. 5B schematically shows a diameter-direction velocity of the first end of the claw with respect to the moving distance of the shifter.
Figure 5C:
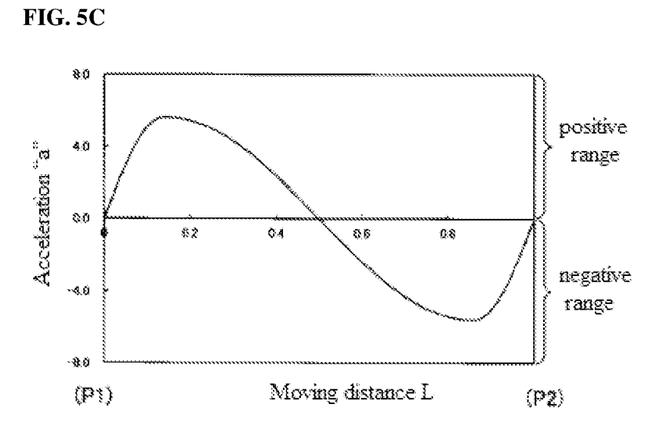
FIG. 5C shows a diameter-direction acceleration of the first end of the claw with respect to the moving distance of the shifter.

The shape of the outer circumference 11 of the shifter 10 in the contact range R1 and the contact end 21 of the claw 20 may be designed to be a continuous acceleration and deceleration shape, a so-called cam curve shape. A cam curve capable of reducing surface pressure between the shifter 10 and the claw 20 is preferred. A modified sine is an example of a more preferred cam curve capable of providing continuous velocity and acceleration and further reducing the maximum velocity and the maximum acceleration during movement. A preferred cam curve may include a modified trapezoid, a modified constant velocity, and any original curve of combined known curves. FIG. 5A to FIG. 5C each shows a modified sine representing the shape of the outer circumference 11 of the shifter 10 in the contact range R1 and the contact end 21 of the claw 20.

FIG. 5A shows the D4-direction position D of the contact end 21 of the claw 20 with respect to the moving distance L of the shifter 10 in longitudinal section along the spindle axis AX2 (FIG. 2). FIG. 5B shows the D4-direction velocity V of the contact end 21 with respect to the moving distance L of the shifter 10 moving in the Z-axis direction at a constant speed in longitudinal section along the spindle axis AX2. FIG. 5C shows the D4-direction acceleration "a" of the contact end 21 with respect to the moving distance L of the shifter 10 moving in the Z-axis direction at a constant speed in longitudinal section along the spindle axis AX2. The "L-a" planar curve as shown in FIG. 5C is a modified sine as an example of the cam curve where the acceleration "a" is continuous all over the moving distance L. A shape achieving such cam curve is called the cam curve shape.

The moving distance L of the shifter 10 may be a relative value. It may be 0 (zero) when the shifter 10 is in the advanced position P1 as shown in FIG. 3A and FIG. 4A. It may be 1 (one) when the shifter 10 is in the retracted position P2 as shown in FIG. 3B and FIG. 4B. The diameter-direction position D of the contact end 21 may be a relative value. It may be 0 (zero) when the shifter 10 is in the advanced position P1 and the contact end 21 is in the closest position to the spindle axis AX2 as shown in FIG. 3A and FIG. 4A. It may be 1 (one) when the shifter 10 is in the retracted position P2 and the contact end 21 is in the furthest position to the spindle axis AX2 as shown in FIG. 3B and FIG. 4B. The diameter-direction position D of the contact end 21 may be represented by a function in which the moving distance L is used as an independent variable. The function may be obtained by calculating a diameter-direction position D at minute intervals of the moving distance L by using the shape data of the outer circumference 11 of the shifter 10 and the contact end 21 of the claw 20.

The velocity "v" of the contact end 21 may be obtained by differentiating the diameter-direction position D with the moving distance L of the shifter 10 moving in the Z-axis direction at a constant speed. The velocity "v" may be represented by a function in which the moving distance L is used as an independent variable. The velocity "v" may be calculated by $v=\Delta D/\Delta L$ where "$\Delta D$" is a minute change in position D with respect to a minute change ($\Delta L$) ($-1<\Delta L<0$ or $0<\Delta L<1$) in moving distance L. The acceleration "a" of the contact end 21 may be obtained by differentiating the velocity "v" with the moving distance L of the shifter 10 moving in the Z-axis direction at a constant speed. The acceleration "a" may be represented by a function in which the moving distance L is used as an independent variable. The acceleration "a" may be calculated by $a=\Delta v/\Delta L$ where "$\Delta v$" is a minute change in velocity with respect to a minute change ($\Delta L$) in moving distance L.

The acceleration "a" of the contact end 21 with respect to the moving distance L of the shifter 10 may be continuous all over the moving distance L as shown in FIG. 5C. The acceleration "a" with respect to the moving distance L may be continuous in the positive range of a>0. The acceleration "a" with respect to the moving distance L may be continuous in the negative range of a<0. Accordingly, the shape of the outer circumference 11 of the shifter 10 in the contact range R1 and the contact end 21 of the claw 20 in longitudinal section along the spindle axis AX2 may be such shape as the acceleration "a" of the contact end 21 in the diameter direction D4 with respect to the moving distance L of the shifter 10 moving in the Z-axis direction at a constant speed is continuous both in the positive range and in the negative range. Such shape prevents a rapid change in acceleration of the contact end 21, thereby suppressing the shock in chucking the workpiece W2 and reducing the surface pressure between the outer circumference 11 and the contact end 21. Reduced pressure prevents abrasion or wear of the shifter mechanism, thereby improving the life thereof.

A first half R2 of the contact range R1 is being described referring to the FIG. 4A and FIG. 4B. As the shifter 10 is moved toward the retracted position P2 in the Z-axis direction, the contact end 21 is caused to tilt in the direction away from the spindle axis AX2. The first half R2 may be a range between a start position B1 and an intermediate position B2 in the Z-axis direction where the start position B1 is the furthest position of the contact range R1 on the retracting direction D3 side and the intermediate position B2 is in the middle of the contact range R1. As shown in FIG. 8, the longitudinal section of the outer circumference 11 at the start position B1 may be extended along the spindle axis AX2 in a direction toward the intermediate position B2. The shape of the outer circumference 11 of the shifter 10 in longitudinal section along the spindle axis AX2 therefore may be first extended along the direction of the spindle axis AX2 and then curved in the first half R2 of the contact range R1. Such shape prevents a rapid change in acceleration of the contact end 21 during the first half of the movement, thereby suppressing the shock in chucking the workpiece W2 and reducing the surface pressure between the outer circumference 11 and the contact end 21. Reduced pressure prevents abrasion or wear of the shifter mechanism, thereby improving the life thereof.

The contact end 21 of the claw 20 in cross section view perpendicular to the spindle axis AX2 is being described referring to the FIG. 6A and FIG. 6B. FIG. 6A schematically shows a cross section of the back headstock 51 taken along the line A1 of FIG. 2. The product ejector 70 inside the back spindle 52 is not shown. FIG. 6A includes an enlarged view of the outer circumference 11 and a contact surface 21a of the contact end 21. The contact end 21 of the claw 20 is in the furthest position from the spindle axis AX2 when the shifter 10 is in the retracted position P2. FIG. 6B schematically shows an appearance of the claw 20.

The contact surface 21a of the contact end 21 in contact with the outer circumference 11 of the shifter 10 may have a R-shape concaved in cross section perpendicular to the spindle axis AX2 in a radius of curvature on the spindle axis AX2 equal to the radius of curvature of the outer circumference 11 or greater. In FIG. 6A, the radius of curvature of the contact surface 21a matches the greatest radius of curvature of the outer circumference 11 in the contact range R1. As the shifter 10 is moved toward the advanced position P1, the radius of curvature of the outer circumference 11 in contact with the contact surface 21a may become gradually smaller than the radius of curvature of the contact surface 21a. Setting the radius of curvature of the concaved contact surface 21a equal to the radius of curvature of the outer circumference 11 or greater may reduce the surface pressure of the contact surface 21a with the outer circumference 11. Reduced pressure lessens abrasive wear of the shifter mechanism, which likely occurs during initial use, resulting in survival of a hardened part of the shifter mechanism. The clamping force of the chucking unit 60 is kept stable and the life of the shifter mechanism is thereby further elongated. Such effect is still expected even when the radius of curvature of the contact surface 21a is greater than the greatest radius of curvature of the outer circumference 11 since the surface pressure of a curved contact surface is still smaller compared to that of a flat contact surface (FIG. 7).

Such effect is still expected in the flat contact surface as shown in FIG. 7 as far as the shape of the outer circumference 11 in the contact range R1 and the contact end 21 in longitudinal section along the spindle axis AX2 is formed as described above.

(3) Method of designing the shape of the outer circumference of the shifter in the contact range and the contact end of the claw: Referring to FIG. 5A to FIG. 5C, a method of designing the shape of the outer circumference 11 of the shifter 10 in the contact range R1 and the contact end 21 of the claw 20 is being described.

A method of designing the acceleration "a" of the contact end 21 in the diameter direction D4 with respect to the moving distance L of the shifter 10 moving toward the retracted position P2 at a constant speed in longitudinal section along the spindle axis AX0 is being described. It is required that the acceleration "a" with respect to the moving distance L is continuous both in the positive range (a>0) and the negative range (a<0) in the L-a plane where the moving distance L in the positive range is 0<L<0.5 and the moving distance L in the negative range is 0.5<L<1 (FIG.5C). Accordingly, the acceleration "a" using the moving distance L as an independent variable is designed to be continuous both in the range of 0<L<0.5 and in the range of 0.5<L<1. It is preferred that the acceleration "a" using the moving distance L as an independent variable is continuous in the whole of the range in the L-a plane. It is further preferred that the acceleration "a" equals 0 (zero) when L equals 0 (zero) and the acceleration "a" equals 0 (zero) when L equals 1 (one).

It is further preferred that the acceleration "a" using the moving distance L as an independent variable is continuous without a bend under the conditions of "a≥TH1" where TH1 is a positive threshold and the acceleration "a" using the moving distance L as an independent variable is continuous without a bend under the conditions of "a≤TH2" where the TH2 is a negative threshold. The threshold TH1 must be smaller than the maximum value of the acceleration "a" (preferably a half or less of the maximum value and more preferably a quarter or less of the maximum value). The threshold TH2 must be greater than the minimum value of the acceleration "a" (preferably a half or more of the minimum value and more preferably a quarter or more of the minimum value). The absolute value of the negative threshold TH2 may be equal to the positive threshold TH1 or may be different from that. It is further preferred that the acceleration "a" with respect to the moving distance L is represented by a curve under the conditions of "a≥TH1" and the acceleration "a" with respect to the moving distance L is represented by a curve under the conditions of "a≤TH2".

The requirements as described above can be satisfied if the acceleration "a" with respect to the moving distance L is represented by a modified sine.

The acceleration "a" of the contact end 21 in the diameter direction D4 with respect to the moving distance L of the shifter 10 moving toward the advanced position P2 at a constant speed in longitudinal section along the spindle axis AX0 may be designed.

Upon determination of the acceleration "a" using the moving distance L as an independent variable, the velocity "v" using the moving distance L as an independent variable is designed as shown in FIG. 5B. The acceleration "a" is integrated by the moving distance L into the velocity "v". For example, the acceleration "a(L)" is calculated every minute interval ΔL (0<ΔL<1) of the moving distance L and then the sum of a(L)×ΔL is calculated to determine the velocity "v".

Upon determination of the velocity "v" using the moving distance L as an independent variable, the diameter-direction position D using the moving distance L as an independent variable is designed as shown in FIG. 5A. The velocity "v" is integrated by the moving distance L into the position D. For example, the velocity "v(L)" is calculated every minute interval ΔL (0<ΔL<1) of the moving distance L and then the sum of v(L)×ΔL is calculated to determine the position D.

Finally, the longitudinal section of the outer circumference 11 of the shifter 10 in the contact range R1 and the contact end 21 of the claw 20 is determined to position the contact end 21 in the diameter-direction position D according to the moving distance L of the shifter 10. Designing the longitudinal section of the outer circumference 11 and the contact end 21 is thereby completed. The shifter 10 and the claw 20 having the outer circumference 11 and the contact end 21 of the determined shape is just fabricated.

Figure 10:
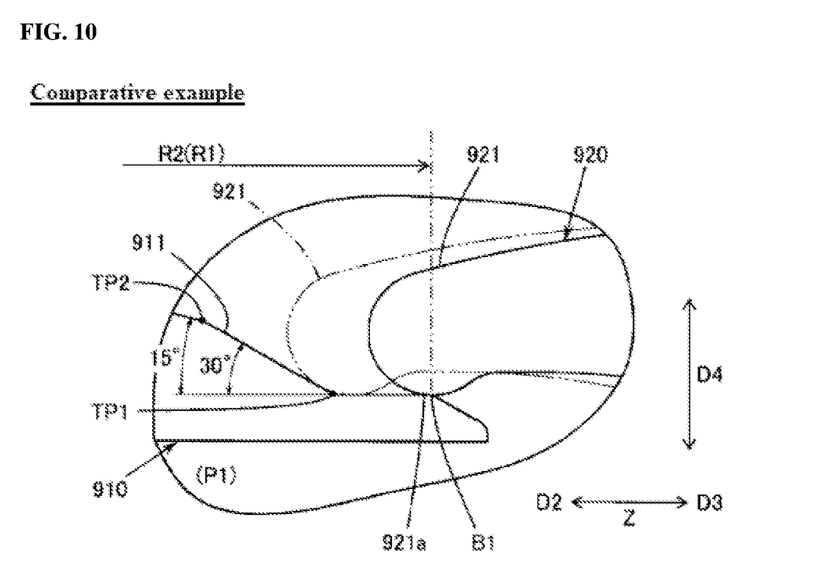
FIG. 10 schematically shows an outer circumference of a shifter and a first end of a claw in a comparative example.

FIG. 10 schematically shows an outer circumference 911 of a shifter 910 in the advanced position P1 and a contact end 921 of a claw 920 in a comparative example. The description is being omitted for the Z-axis direction, the advancing direction D2, the retracted direction D3, the diameter direction D4, the advanced position P1, the contact range R1, the first half R2, and the start position B1 whose symbols are common to the embodiment. In FIG. 10, a contact surface 921a of the contact end 921 is in contact with the outer circumference 911 in the start position B1. The shape of the outer circumference 911 in the first half R2 in longitudinal section along the spindle axis includes a bend TP1 having a sudden change of an angle with respect to the spindle axis from 0 to 30 degrees and a bend TP2 having a sudden change of the angle from 30 to 15 degrees between the start position B1 and an intermediate position (not shown). The outer circumference 911 in the first half R2 in longitudinal section along the spindle axis is bent at the bends TP1 and TP2.

As the shifter 910 is moved toward the retracting direction D3, the contact end 921 of the claw 920 slides on the 30-degrees-angled outer circumference 911 near the bend TP1 and goes outwards in the diameter direction D4 (upward in FIG. 10) with a sudden acceleration, which creates a larger impact in chucking the workpiece and thereby generates a higher surface pressure between the outer circumference 911 and the contact end 921. Then the contact end 921 suddenly decelerates when passing the bend TP2 whose angle is suddenly changed from 30 to 15 degrees, which creates a larger impact in chucking the workpiece. Further, as the shifter 10 is moved toward the advancing direction D2, a larger impact is created in chucking the workpiece at the bends TP2 and TP1. The contact end 921 suddenly decelerates at the bend TP1 resulting in an occurrence of a higher surface pressure between the outer circumference 911 and the contact end 921.

Figure 11:
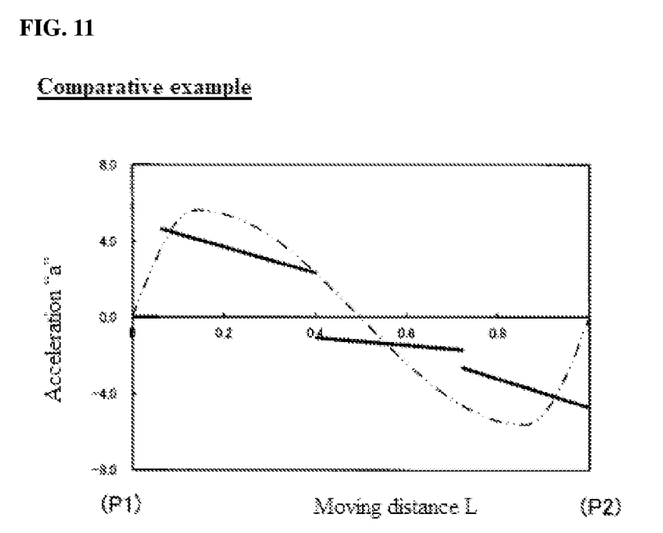
FIG. 11 is an example of a diameter-direction acceleration of the first end of the claw with respect to the moving distance of the shifter in the comparative example.

FIG. 11 schematically shows the D4 diameter-direction acceleration "a" of the contact end 921 with respect to the moving distance L of the shifter 910 in the comparative example. FIG. 11 only shows an example of discontinued lines of an acceleration with respect to a moving distance L and not the acceleration in the combination of the shifter 910 and the claw 920 in FIG. 10. For example, the acceleration "a" appears suddenly high when the moving distance L is 0.1. The acceleration is not continuous at that moment, which creates a larger impact in chucking the workpiece and thereby generates a higher surface pressure between the outer circumference 911 and the contact end 921. The problem resides in the shifter 910 moving toward the advancing direction D2.

The higher surface pressure between the outer circumference 911 and the contact end 921 would likely cause abrasion or wear of the shifter mechanism and shorten the life thereof.

FIG. 8 schematically shows the outer circumference 11 of the shifter 10 in the advanced position P1 and the contact end 21 of the claw 20. The outer circumference 11 in the contact range R1 in longitudinal section along the spindle axis may be a continuous curve with no bends.

When the shifter 10 is moved in the retracted direction D3, the contact end 21 of the claw 20 is caused to tilt outwards in the diameter direction D4 (upward in FIG. 10) with a moderate acceleration on the outer circumference 11 first extended along the direction of the spindle axis AX2 and then gradually curved. The contact end 21 may be guided by the outer circumference 11 whose longitudinal section is shaped in such manner as the acceleration "a" of the contact end 21 with respect to the moving distance L of the shifter 10 to be continued in the positive range and in the negative range. Such shape prevents a rapid change in acceleration of the contact end 21 in the diameter direction D4, resulting in a smaller impact in chucking the workpiece and a lower surface pressure between the outer circumference 11 and the contact end 21. The effect is still expected in the shifter 10 moving toward the advancing direction D2.

In this embodiment, a lower surface pressure between the outer circumference 11 and the contact end 21 lessens abrasion or wear of the shifter mechanism and thereby elongates the life thereof. As shown in FIG. 6A and FIG. 6B, making the contact surface 21a of the contact end 21 concaved in cross section in a radius of curvature on the spindle axis AX0 equal to the radius of curvature of the outer circumference 11 or greater may further lessen abrasive wear of the shifter mechanism, thereby further elongating the life thereof.

(4) Modifications: The invention is not limited to the lathe of slidable headstock type. The invention may be applied to a lathe of stationary headstock type and a lathe of cam type. The invention is not limited to the back headstock. The invention may be applied to the front headstock. In the front headstock 41 as shown in FIG. 1, the shape of the outer circumference of the shifter in the contact range and the first end of the claw in longitudinal section along the spindle axis AX1 may be such shape as the acceleration "a" of the first end in the diameter direction with respect to the moving distance L of the shifter moving in the Z-axis direction at a constant speed is continuous both in the positive range and in the negative range. The shape of the outer circumference in longitudinal section along the spindle axis AX1 may be first extended along the direction of the spindle axis AX1 and then curved in the first half of the contact range of the shifter moving in the direction of the spindle axis AX1 to bring the first end away from the spindle axis AX1.

A modified sine providing a continuous curve all over the moving distance L is a preferred example of the cam curve representing the acceleration "a" of the contact end 21 with respect to the moving distance L of the shifter 10. The cam curve of the embodiment may include another cam curve such as a modified trapezoid and a modified constant velocity providing a continued combination of a curve and a straight line all over the moving distance L. The modified trapezoid provides a continuation connecting a linear maximum acceleration and a linear minimum acceleration with a curve. The modified constant velocity provides a continuation connecting an intermediate straight line of zero acceleration with a curve. Even a cam curve having a discontinued portion in a range of lower acceleration has an effect of suppressing the chucking impact and reducing the surface pressure between the outer circumference of the shifter and the first end of the claw.

Figure 9:
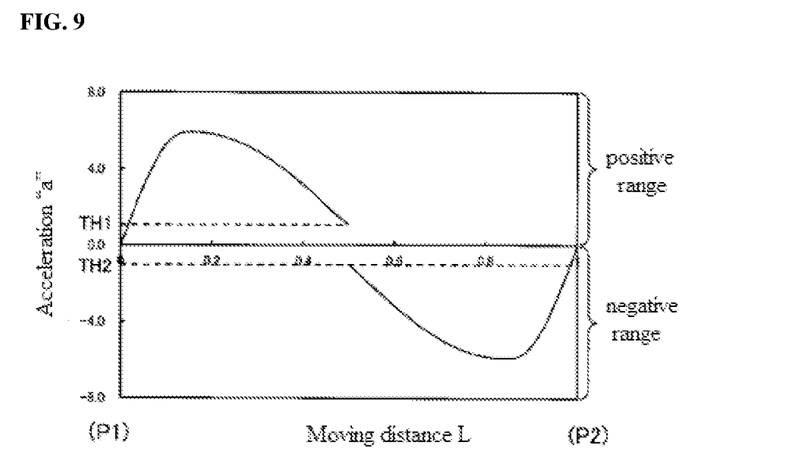
FIG. 9 is another example of a diameter-direction acceleration of the first end of the claw with respect to the moving distance of the shifter.

FIG. 9 shows another embodiment of the D4 diameter-direction acceleration "a" of the contact end 21 with respect to the moving distance L of the shifter 10 moving in the Z-axis direction at a constant speed in longitudinal section along the spindle axis AX2. The acceleration "a" of the cam curve is discontinued at L=0.5. The acceleration "a" using the moving distance L as an independent variable is continuous without a bend under the conditions of "a≥TH1" where TH1 is a positive threshold. The acceleration "a" using the moving distance L as an independent variable is continuous without a bend under the conditions of "a≤TH2" where the TH2 is a negative threshold. The threshold TH1 must be smaller than the maximum value of the acceleration "a" (preferably a half or less of the maximum value and more preferably a quarter or less of the maximum value). The threshold TH2 must be greater than the minimum value of the acceleration "a" (preferably a half or more of the minimum value and more preferably a quarter or more of the minimum value). If the acceleration is discontinued only in a small range of TH1<a<TH2, the cam curve still has an effect of suppressing the chucking impact and reducing the surface pressure between the outer circumference of the shifter and the first end of the claw. Reduced pressure prevents abrasion or wear of the shifter mechanism, thereby improving the life thereof.

(5) Conclusion: As described above, the invention provides a lathe capable of improving live of the shifter mechanism. The advantageous effects of the invention are available in a technology embodied only by the requirements recited in an independent claim. The elements disclosed in the embodiments may be mutually replaced. The combinations of the elements may be modified. The elements and the prior arts may be mutually replaced. The combination of the elements and the prior arts may be modified. They are all within the scope of the invention.

The invention claimed is:

1. A lathe comprising:
   a spindle rotatable on a spindle axis;
   a chuck mounted on the spindle to hold a workpiece in a closed state and release the workpiece in an open state;
   a power transmitting unit having a first contact part in contact with the chuck and a second contact part opposite the first contact part with respect to a direction of the spindle axis, the power transmitting unit being movable in the direction of the spindle axis to open and close the chuck;
   a shifter arranged outside the spindle to be movable in the direction of the spindle axis;
   a claw having a first end in contact with an outer circumference of the shifter and a second end in contact with the second contact part of the power transmitting unit, the claw being caused to tilt in such direction as a distance from the spindle axis to the first end is changed;
   a driver which moves the shifter in the direction of the spindle axis to tilt the claw and thereby move the power transmitting unit in the direction of the spindle axis;
   wherein a shape of the outer circumference of the shifter in a contact range including both straight and curved portions of the shifter where the first end of the claw contacts, in longitudinal section along the spindle axis, is a cam curve shape that does not have any discontinuity.

2. The lathe of claim 1, wherein a contact surface of the first end of the claw in contact with the outer circumference of the shifter is concaved in cross section perpendicular to the spindle axis in a radius of curvature on the spindle axis equal to the radius of curvature of the outer circumference or greater.

3. The lathe of claim 2, wherein the shape of the outer circumference of the shifter in longitudinal section along the spindle axis is first extended along the direction of the spindle axis and then curved in a first half of the contact range when the shifter is moved in such direction of the spindle axis as to bring the first end away from the spindle axis.

4. The lathe of claim 1, wherein the shape of the outer circumference of the shifter in longitudinal section along the spindle axis is first extended along the direction of the spindle axis and then curved in a first half of the contact range when the shifter is moved in such direction of the spindle axis as to bring the first end away from the spindle axis.

5. A lathe comprising:
   a spindle rotatable on a spindle axis;
   a chuck mounted on the spindle to hold a workpiece in a closed state and release the workpiece in an open state;
   a power transmitting unit having a first contact part in contact with the chuck and a second contact part opposite the first contact part with respect to a direction of the spindle axis, the power transmitting unit being movable in the direction of the spindle axis to open and close the chuck;
   a shifter arranged outside the spindle to be movable in the direction of the spindle axis;
   a claw having a first end in contact with an outer circumference of the shifter and a second end in contact with the second contact part of the power transmitting unit, the claw being caused to tilt in such direction as a distance from the spindle axis to the first end is changed;
   a driver which moves the shifter in the direction of the spindle axis to tilt the claw and thereby move the power transmitting unit in the direction of the spindle axis;
   wherein the shape of the outer circumference of the shifter in longitudinal section along the spindle axis is first extended along the direction of the spindle axis and then curved without any discontinuity in a first half of a contact range when the shifter is moved in such direction of the spindle axis as to bring the first end away from the spindle axis where the contact range is a range of the outer circumference of the shifter in contact with the first end of the claw and
   wherein a curvature radius of the outer circumference of the shifter in a concaved part of the first half of the contact range is equal to or greater than a curvature radius of the first end of the claw.

* * * * *